UNITED STATES PATENT OFFICE.

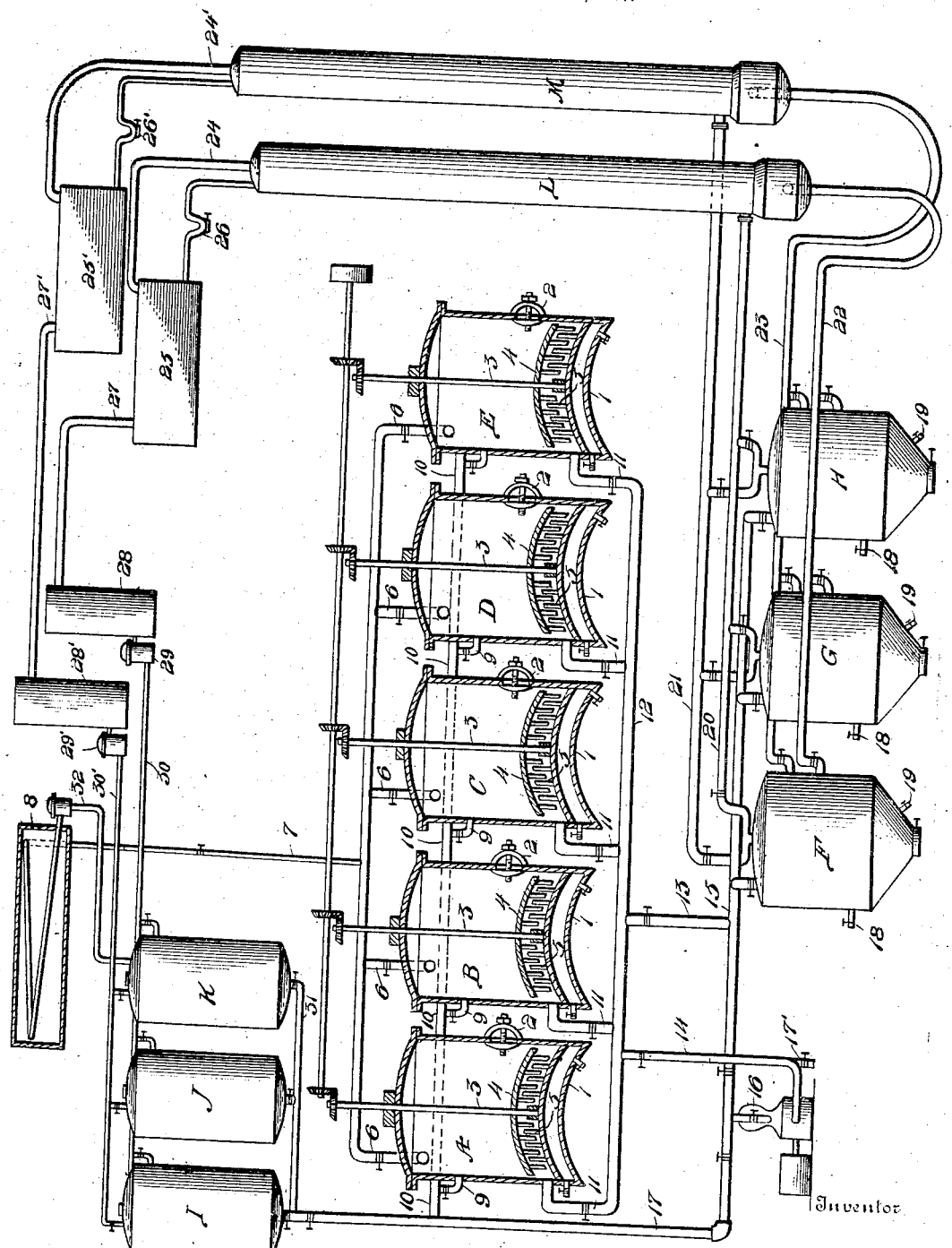

HARRY O. CHUTE, OF CLEVELAND, OHIO.

ART OF PURIFYING RUBBER.

No. 890,218.     Specification of Letters Patent.     Patented June 9, 1908.

Application filed January 11, 1907. Serial No. 351,863.

*To all whom it may concern:*

Be it known that I, HARRY O. CHUTE, residing at Cleveland, in the county of Cuyahoga and State of Ohio, have invented certain new and useful Improvements in the Art of Purifying Rubber; and I do hereby declare the following to be a full, clear, and exact description of the same, such as will enable others skilled in the art to which it appertains to make and use the same.

This invention relates to the art of purifying rubber and consists in a method of purifying crude rubber and apparatus for performing the same, said method consisting in methodically extracting the various impurities of crude rubber by certain compound solvents exercising selective action upon certain constituents, and used in regulated amounts and in a regulated way, and said apparatus comprising structures adapted to selectively extract various impurities from crude rubber and to perform other like operations; all as more fully hereinafter set forth and as claimed.

Crude rubbers, particularly those of the poorer grades, contain relatively large amounts of impurities, this being especially true of the rubbers from the newer sources, such as pontianak, or "dead borneo," guayule, Africans, and a number of the "extracted rubbers." Better grade products such as ordinary balata and gutta-percha are also apt to be impure. The impurities comprise in addition to water, which occasionally exists in rather large amount and is difficult to remove, considerable quantities of resin and some fats and extractive matters. Extracted rubbers, made by digesting vegetable materials with hydrocarbon solvents, contain besides the rubbery gum proper, practically everything which was soluble in the original material, and in addition much of the hydrocarbon employed. Gasolene and naphtha, the solvents most used, invariably contain more or less of the higher-boiling hydrocarbons like lubricating oils, and these are apt to stay with the rubber throughout. Hydrocarbons and crude petroleum are also often used in precipitating latex or in curing the precipitate, and hydrocarbons from these sources are frequently found in crude non-extracted commercial rubbers. In finished rubber goods these hydrocarbon bodies are quite detrimental.

The amount of water and resin in some samples of crude rubber is quite large, as for instance in some samples of crude pontianak which contain 60 per cent. water and 30 per cent. resin to only about 10 per cent. real rubber, or in guayules which contain a third of their weight in resin, water and other impurities. Some of this resin is probably formed by the oxidation of the rubbery gums, but much of it is probably naturally associated with such gums in the plants.

Speaking broadly, in purifying crude rubbers, it is necessary to remove water, resin and injurious hydrocarbons. Water is difficult to remove as the crude rubber cannot well be heated to any extent without injurious oxidation and such moisture as happens to exist interiorly of a lump of rubber is effectually sealed therein. In its presence, few of the resin solvents act well.

Many solvents have been tried for the purpose of purifying crude rubber, but they usually have proved objectionable in one way or another. The hydrocarbons while dissolving resin and hydrocarbon impurities also dissolve some rubber, while they do not contact well with moist rubber. And they usually leave some residual hydrocarbon behind in the purified rubber; possibly in the form of a "solid solution." Other solvents which have been tried while not dissolving rubber also lack solvent power on resins. As the volatile solvents are all relatively expensive, lack of solvent power means that more of the solvent must be employed, and this is a serious matter.

I have discovered that by using a compound solvent consisting of methyl acetate and acetone in about equal parts, a very good purification can be effected, and particularly when used in the methodical way hereinafter set forth. This compound solvent is miscible with water and dissolves it out of the crude rubber. Consequently it "wets" or contacts with the rubber very thoroughly, which enables it to reach the resins. The resins are very soluble in this compound solvent, and relatively little of the latter is therefore requisite to treat much rubber. A mixture of about equal parts of the two ingredients will dissolve about 20 per cent. of resin without dissolving the rubber. I have found that the character or source of the acetone used is not a matter of indifference, the low boiling ketonic body extracted from wood spirit and known in commerce under the name of "methyl acetone" being rather better adapted for this purpose than ordinary acetone made from acetates, as giving the mixture better solvent powers, and being a better protective agent. However, such ordinary acetone may be used.

Methyl acetate and acetone, or "methyl acetone", having boiling points only about 3 degrees apart, the mixture when once made is tolerably permanent under conditions existing in the process and may be readily fractionated away from water as a whole. Alone, methyl acetate tends to hydrolyze or split up with water, especially when heated therewith, as in fractionating it away from water, to re-form the acetic acid and methyl alcohol from which it was originally made, but in the presence of acetone or methyl acetate, this tendency disappears. In treating raw, crude, moist rubber of course water inevitably gains access to the solvent and this protective action is a great advantage. The new compound solvent readily dissolves whatever injurious hydrocarbons may be in the rubber.

In use, the rubber may simply be torn or disintegrated in the presence of the compound solvent described. Water and resin and hydrocarbon dissolve, leaving the rubber behind. By now washing the rubber with a little water, the residual solvent is at once extracted, leaving the rubber free of volatile bodies. From this portion of water the solvent is readily regained by distillation in condition to serve anew. As stated, the methyl acetate is protected by the presence of the other solvent from the chemical action of the heated water in such distillation. On further washing the rubber with more water, using any of the ordinary mills or rolls for this purpose, removal of sticks, leaves, sand and other mechanical impurities can be accomplished with extraordinary ease, the removal of the sticky resins leaving the rubber proper with little tendency to cling to foreign bodies. The completeness with which subsequent mechanical purification can be effected is one of the great advantages of the use of my process.

As stated, ordinary acetone may be substituted for the methyl acetone, either in whole or in part, but I prefer the latter body. Methyl acetate may also be protected against decomposition with water by the use of one of its hydrolytic products, namely methyl alcohol. Under the phase rule, the decomposition ordinarily proceeds to a certain balance between the amount of decomposed and undecomposed material in the presence of a given amount of water, but decomposition can be prevented as well by the use of a balancing amount of one of the decomposition products as by both together. About 10 per cent. of methyl alcohol will protect methyl acetate, and the mixture forms an efficient solvent for present purposes. Ethyl acetate may be substituted for the methyl ester in admixture with acetone, or ethyl acetate protected by a proper amount of its dissociation product, namely ethyl alcohol, may also be used.

In methodical work, it is better to replace the simple treatment described by a more systematic treatment economizing solvent by using the same portion of solvent successively on different portions of rubber. A mixture of methyl acetate and methyl acetone has considerable affinity for water and readily dehydrates rubber. The water-containing solution so formed however is not as good a solvent for resins as when dry, but after once dissolving resins it will stand some absorption of water. In the case of moderately moist rubber therefore a very suitable method of operation is to treat the fresh rubber with a portion of solvent which has extracted resin from another portion. This resin-saturated, but dry solvent will extract the water without much precipitation of resin. The dried rubber may now be treated with fresh dry solvent to extract the resin, and the solution so formed utilized to dry more rubber prior to its going to the recovery still.

In the case of very moist rubbers, like pontianak, which occasionally contains up to 60 per cent. moisture, the procedure is advantageously still more elaborate, each portion of rubber being treated at least four times, using two portions of solvent. As stated, water-containing solvent does not dissolve the resin well. Therefore the fresh rubber is treated in two stages to dry it and then in two stages to extract the resin. The fresh rubber is first contacted with solvent which has been contacted with another portion of rubber. This takes out nearly all the water, leaving only a little in the form of a solvent solution wetting the rubber. The solution of solvent and water goes to the still. The solvent-wetted rubber is next treated with a fresh portion of fresh dry solvent to remove the traces of water. The solvent drawn off is used in the first-stage proceeding on fresh rubber. The rubber which has been twice treated is now treated again with a portion of solvent which has once before been used on dry rubber, and the saturated resin solution formed is sent to the still. The thrice extracted rubber is now treated once more but this time with fresh solvent and the resin solution formed is passed over dried rubber for the third-stage extraction described. In this method of operation it will be seen that the same portion of rubber is treated with two portions of solution in two stages for each portion of solvent; it is a four-bath treatment in two series. In the first series the water is methodically extracted; in the second series the resin is methodically extracted. The extract formed in each series goes to the same still and the solvent is there recovered by being distilled away from the water and resin. As stated, with the compound solvent described this distillation in the presence of water is not injurious. The extractions in each stage of course may be more than two in number; two having been described for the sake of simplicity. Two are however commonly sufficient.

One type of apparatus of the many adapted to perform the described process is shown in the accompanying drawing. In this illustration, A, B, C, D and E respectively, designate five extractors arranged as a battery. While more may be employed, five are a convenient number. Each extractor consists substantially of a closed tank of any suitable material, provided with heating means, which may be, as shown, a hollow double bottom 1, provided with steam inlets and outlets. Manhole 2 is for introduction and removal of rubber. Internally is a revoluble shaft 3, carrying breaker arms 4 rotating between stationary knives or breakers 5. Each extractor communicates by valved outlet 6 with a common pipe 7, going to a condenser 8 to recover volatilized solvent. Valved inlets 9 on each extractor allow the introduction of solvent from solvent pipe 10. Valved outlets 11 allow the withdrawal of charged solvent to exhaust line pipe 12. Communicating with the latter are two valved pipes, 13 and 14, the former communicating directly with a still line pipe 15 while the latter communicates therewith through pump 16. The pump has a discharge extension 17 communicating with the line pipe (10). Pipe 17′ allows introduction of water. Three kettles, lettered respectively F, G and H, connect directly with the still line pipe (15) and receive liquid from the extractors therethrough. Each of these kettles is provided with steam heating means fed by inlet and exhaust 18 and 19. Two vapor line pipes 20 and 21, communicate with each kettle through valved pipes. Two column return lines, 22 and 23 also have valved communication with each kettle.

Two columns, L, and M, are provided for the fractionation respectively of low grade solvent and high grade solvent, each being fed by one of the vapor line pipes and returning exhausted liquid back to the kettles through one of the column return lines. Each column is of the usual internal construction. The two columns are provided with identical condensing means at the top. Describing L, this consists of a vapor pipe 24 communicating with the usual goose 25, from which condensates are returned to the column through 26. From the goose, uncondensed rich vapors pass through pipe 27 to and through a condenser 28, safe 29 and solvent pipe 30. Column M is fitted with the same attachments, respectively lettered 24′, 25′, 26′, 27′, 28′, 29′ and 30′. Each solvent pipe, 30 and 30′, communicates through valved pipes with each of a series of three solvent tanks I, J and K. Each of these tanks in turn communicates with pipe 31 which connects with the solvent line pipe (10). From the condenser 8 connected to the extractors, a solvent pipe 32 leads to a solvent tank. With the battery of five extractors shown, four are in operation while the fifth is being charged or discharged. The battery allows operation in a number of different ways, adapted to the particular rubber being treated. With most low grade rubbers the preferable operation is to give a portion of rubber in any one extractor a treatment with four portions of solvent; two portions to dehydrate and two to remove resin. While any other solvent may be used in the apparatus just described, the compound solvents stated are preferred because of their relations to water and the resins in rubber. They combine the great solvent power of acetic esters for the resins of crude rubber with innocuousness as far as the rubber itself is concerned while at the same time, because of the protective substance used with the ester they can be safely used to dehydrate and when so used can be recovered from the extracted water. However, acetone or methyl acetone may be alone used. It is, however not regarded as so advantageous.

With low grade, wet rubbers, the operation may be as follows:—Rubber being supposed to be placed in A, the macerating device is set in rotation and sufficient steam admitted to hold contained solvent at or near the boiling temperature. Solvent from, say B, which has once been in contact with rubber therein, thoroughly dehydrating it, is passed into A by means of 11, 14, 16, 17, 10 and 9, and extracts the major portion of the water from such rubber. The water-containing solvent is discharged by means of 11 and 13, or 11 and 14 and 16, into 15 and hence into any desired kettle. The rubber in A which has been once treated with dehydrating solvent as described, is next treated with fresh dry solvent coming from one of the solvent tanks through 31, 10 and 9, to remove residual wet solvent. After being thoroughly contacted with the rubber, this portion of the solvent serves to dry fresh rubber in one of the other extractors. The portion of rubber in A which has now been treated twice with dehydrating solvent, is now treated to extract the resin. For this purpose a portion of partly saturated solvent which has been used to treat another portion of rubber, is admitted to A from 12, through 14, 16, 17 and 10 and 9 and thoroughly contacted with the rubber therein by the macerating device. It is then fed out through 11, 12 and 13 and 15 (or 11, 12, 14 and 16) to one of the kettles. The rubber in A is next treated with a fresh portion of the solvent direct from the solvent tanks and macerated therewith. After taking up what resin it will, this portion is sent to treat another portion of dried rubber and thence to the kettles.

In the described operation, it will be seen that the rubber has been four times treated with the solvent; once with once-used drying solvent, next with fresh drying solvent, then with once-used resin extracting solvent and finally with fresh solvent, while two portions of solvent have been used, one portion treating two lots of rubber to extract water and then going to the kettle while the other portion treats two lots of rubber to extract resin and then goes to the kettles. The reason for this manner of operation is that water-containing solvent is not so good for extracting resin, neither can resin be well extracted from moist rubber.

The 4-stage, 2-solvent portion treatment is best adapted to very moist rubber. If the crude rubber is drier, the dehydration can be restricted to one stage, the fresh solution used being run directly to the kettle without use on another portion of rubber. It is ordinarily best, however, to conduct the resin extraction proper in a plurality of stages to secure the maximum utilization of the solvent power of the solvent used.

The rubber which has been methodically treated in the manner described is now ready for washing. With the water removed as stated, the resin is very thoroughly extracted, freeing the rubber of its stickiness and by simple maceration with water it can be thoroughly freed of such mechanical impurities as sticks, stones, sand, leaves, dirt and the like. For this purpose water is introduced in the extractor A, through 17', 16 17, 10 and 9. This is best done in two stages, a little water being introduced and heated to absorb and boil off the solvent, which escapes through 6, 7 and 8. More water is then added and the maceration continued until the rubber is agglomerated into a mass free from mechanical impurities. The first water may, if desired, be run into one of the kettles.

The rubber in each extractor may be treated in the manner described for A, by appropriate manipulation of valves and in practice four of the extractors are working with solvent while the fifth is being treated with water, discharged and recharged. Each of course in turn becomes the fifth in series.

In the operation of the kettles, two are ordinarily in use while water and resin are being removed from the third. The water containing solvent from the first two extractions, supposing the 2-stage, 4-bath treatment to be employed, is run into one kettle, say F, while the richer resin solution is run into G, H being out of operation. After the solution is distilled off and the resin and liquid from the column accumulate therein, water containing solution is now run into H and so on. The vapors from the kettle which happens to be operating on the rich liquid are always sent into the higher grade column M while more watery vapors are sent into L. The particular arrangement of the three kettles with the two columns and the storage tanks which is shown has many advantages.

In the described methodical treatment given the crude rubber, it will be seen that portions of solvent with widely varying quantities of water or of resin may be discharged into any one of the kettles and the apparatus shown enables a very methodical treatment of these varying liquids.

From the varying liquids stated, the columns will produce varying distillates and these may be received separately by the various solvent tanks, I, J, and K. Pure dry solvent is returned to the extractors for re-use while less pure or less dry solvent such as may be delivered by column L is returned by way of pipes 31, 17 and 15 to a kettle at the moment handling similar liquid, whence its vapors in a relatively concentrated state go into the high-grade column M.

Either column can be connected with any kettle, as already stated, and there will always be one kettle idle for cleaning out preparatory to beginning its cycle of activity. In use, the columns take the vapors delivered to them by the kettles and concentrate such vapors in a certain degree, high-grade column M delivering from the rich vapors passed into it, a high-grade dry solvent while low-grade column L, concentrating relatively poor vapors to the same extent, delivers a comparatively rich but moist solvent. By use of the two columns, complete concentration is rendered practicable, the one never handling anything but rich vapors while the other prepares poorer material for its use.

Should the entire charge in any one kettle be worked in one column after the solvent was boiled off from the kettle, the column would have a weak solution in its chambers, which would render it substantially impossible, with convenient and economical working to form concentrated solvent from the next charge.

Assuming that a charge of solvent, water and resin, relatively rich in solvent is in F, high-grade vapors are first boiled off and sent through pipe 21 to M for concentration, the weak liquid from the base of the still being returned to F through 23. When the richer vapors have been boiled off, and the vapors become weaker, the valves are changed and the vapors are led through 20 to L. M has produced high-grade solvent; L will now produce a less high-grade solvent which is received in one of the solvent tanks for return to a kettle dealing at the moment with rich liquid. After exhaustion of the rich vapors from F, column M is next connected to, say, G, which is temporarily producing rich vapors and so on. Each kettle alternately communicates with M and L in handling a fresh charge. Thus M and L are continuously at work producing solvent of different grade.

In case a higher boiling solvent is desired, higher ketones, such as methyl-propyl ketone, may be substituted for all or part of the acetone or "methyl acetone."

What I claim is:—

1. The process of purifying rubber which consists in treating the same with a compound solvent comprising acetone and methyl acetate.

2. The process of purifying rubber which consists in treating the same with a compound solvent comprising methyl acetone and methyl acetate.

3. The process of purifying rubber which consists in treating the same with a compound solvent comprising methyl acetone and an acetic ester.

4. The process of purifying rubber which consists in treating the same with a compound solvent comprising a ketone and an acetic ester.

5. The process of purifying rubber which consists in treating the same with a compound solvent comprising acetone and an acetic ester.

6. The process of purifying rubber which consists in treating the same with a solvent to remove water and then treating with another portion of a solvent to remove resin.

7. The process of purifying rubber which consists in treating the same with a solvent to remove water, treating with another portion of a solvent to remove resin and macerating in the presence of water to remove mechanical impurities.

8. The process of purifying rubber which consists in treating the same with a solvent in a plurality of stages to remove water methodically, and treating with another portion of a solvent to remove resin.

9. The process of purifying rubber which consists in treating the same with a solvent in a plurality of stages to remove water methodically, and treating with another portion of a solvent to remove resin in a plurality of stages.

10. The process of purifying rubber which consists in treating the same with a compound solvent comprising an acetic ester and a protective substance and thereby removing water and then treating with another portion of solvent to remove resin.

11. The process of purifying rubber which consists in treating the same with a compound solvent comprising methyl acetate and acetone and thereby removing the water and then treating with another portion of the same solvent to remove resin.

12. The process of purifying rubber which consists in treating the same with a compound solvent comprising an acetic ester and a protective substance and thereby removing water and then treating with another portion of the same solvent to remove resin.

13. The process of purifying rubber which consists in treating the same with a portion of a compound solvent comprising an acetic ester and a protective substance and thereby dehydrating the same, treating with another portion of the same solvent to remove resin and finally macerating with water to remove mechanical impurities.

14. The process of purifying rubber which consists in treating the same with two successive portions of solvent to remove water, and then treating with a plurality of successive portions of solvent to remove resin.

15. The process of purifying rubber which consists in dehydrating crude rubber by once-used solvent and removing the water containing solvent for recovery of solvent, completing the dehydration by fresh solvent and removing the solvent for re-use, extracting the resin from the dried rubber by once-used solvent and removing the solution formed for recovery of solvent, and extracting residual resin by fresh solvent and removing the solvent for re-use.

16. The process of purifying rubber which consists in dehydrating crude rubber by once-used solvent and removing the water containing solvent for recovery of solvent, completing the dehydration by fresh solvent and removing the solvent for re-use, extracting the resin from the dried rubber by once-used solvent and removing the solution formed for recovery of solvent, extracting residual resin by fresh solvent and removing the solvent for re-use and finally macerating the rubber with water to remove residual solvent.

17. The process of purifying rubber which consists in dehydrating crude rubber by once-used solvent and removing the water containing solvent for recovery of solvent, completing the dehydration by fresh solvent and removing the solvent for re-use, extracting the resin from the dried rubber by once-used solvent and removing the solution formed for recovery of solvent, extracting residual resin by fresh solvent and removing the solvent for re-use and finally macerating the rubber with water to remove residual solvent and mechanical impurities.

18. The process of treating crude rubber which consists in extracting crude rubber with successive portions of solvent to dehydrate and extract resin, transmitting the used portions to a common boiling kettle, boiling therein, collecting and concentrating the first rich portions of vapors in a column, storing the rich condensate therefrom for re-use and returning the weak liquid therefrom to the kettle, collecting and concentrating succeeding poorer vapors in a second column, collecting the condensate therefrom and returning to a boiling kettle to be mixed with a fresh rich charge, returning the weak liquid to the original kettle and boiling therein till solvent is removed.

19. In a rubber purifying plant, the combination of a common solvent tank, a plurality of extractors each having valved connections therewith, a plurality of distilling kettles each having valved connections with each of the extractors, a plurality of columns and condensing apparatus each having vapor and liquid connections with each kettle, and pipe connections enabling the product of one column to pass to the solvent tank and that of another to return to the kettles.

20. In a rubber purifying plant, the combination of a plurality of extractors, pipe connections enabling used liquid from any of such extractors to be returned to any other, pipe connections enabling introduction of fresh liquid into any of such extractors, a plurality of distilling kettles, pipe connections enabling liquid from any extractor to be introduced into any of such kettles, and fractionating and condensing means enabling the vapors from the kettles to be returned to the extractors in a concentrated dry state.

21. In a rubber purifying plant, the combination of a plurality of extractors connected in battery for alternate and successive use, steam heating means and condensing means on each of said extractors, and a still and pipe connections enabling liquid from the extractors to be fractionated and returned to the extractors.

22. In a rubber purifying plant, a plurality of extractors connected in battery for successive use of a portion of solvent on a plurality of samples of rubber, a common solvent supply tank connected to all the extractors and means for receiving liquid from each of the extractors, recovering solvent therefrom and returning to the solvent supply tank.

23. In a rubber purifying plant, a plurality of extractors connected in battery for successive use of a portion of solvent on a plurality of samples of rubber, a source of solvent supply, a solvent pipe having connections with each extractor, a plurality of kettles, an exhaust solvent pipe having valved connections with each extractor and each kettle, and fractionating and distilling means having connection with each kettle and also with the source of solvent supply.

24. In a rubber purifying plant, a plurality of extractors, means for introducing fresh solvent into each extractor, means for conveying used solvent from any extractor to any other extractor, means for removing and concentrating solvent from any extractor and means for returning the concentrated solvent to any extractor.

25. In a rubber purifying plant, a plurality of extractors, means for heating and macerating rubber in the presence of liquid in each extractor, means for passing used liquid from any one of the extractors to any other, means for introducing fresh liquid into each extractor, means for removing and distilling used liquid and returning concentrated solvent, and means for introducing water into any of said extractors.

26. The process of purifying rubber which consists in extracting water from crude rubber with a solvent, extracting resin with a solvent from the so-dried rubber, and extracting residual solvent from the so-extracted rubber with a portion of water.

In testimony whereof I affix my signatu in the presence of two witnesses.

HARRY O. CHUTE

Witnesses:
B. L. CHADWELL.
K. P. McELROY.